United States Patent [19]

Polzer et al.

[11] Patent Number: 5,056,751
[45] Date of Patent: Oct. 15, 1991

[54] HOLDING DEVICE FOR A TILTABLE MIRROR FOR VEHICLES

[75] Inventors: Herwig Polzer; Richard Seubert, both of Miltenberg; Hai J. Fuchs, Dorfprozelten, all of Fed. Rep. of Germany

[73] Assignee: Hohe KG, Kommanditgesellschaft, Fed. Rep. of Germany

[21] Appl. No.: 424,934

[22] Filed: Oct. 23, 1989

Related U.S. Application Data

[62] Division of Ser. No. 239,348, Sep. 1, 1988, Pat. No. 4,893,390.

[30] Foreign Application Priority Data

Sep. 3, 1987 [DE] Fed. Rep. of Germany ... 8711959[U]

[51] Int. Cl.5 .................................................. B60R 1/06
[52] U.S. Cl. ..................................... 248/479; 248/549; 248/900
[58] Field of Search ........ 248/479, 900, 549, 485–487, 248/475.1; 350/604; 16/49

[56] References Cited

U.S. PATENT DOCUMENTS

| 3,028,619 | 4/1962 | Schlage et al. ................ 16/49 |
| 3,051,982 | 9/1962 | Lasier ........................ 16/49 |
| 3,889,915 | 6/1975 | Hashiguchi et al. .......... 248/475.1 |
| 4,218,036 | 8/1980 | Pitkanen ..................... 248/478 |
| 4,247,173 | 1/1981 | Vitaloni ...................... 248/479 X |
| 4,253,633 | 3/1981 | Takegawa ..................... 248/471.5 |
| 4,464,017 | 8/1984 | Wada ......................... 248/900 X |
| 4,498,738 | 2/1985 | Kumai ........................ 248/900 |
| 4,592,529 | 6/1986 | Suzuki ....................... 248/900 |
| 4,606,619 | 8/1986 | Yamana ....................... 248/900 X |
| 4,636,045 | 1/1987 | Suzuki ....................... 350/632 |
| 4,740,066 | 4/1988 | Whitehead .................... 248/486 X |

FOREIGN PATENT DOCUMENTS

| 0029813 | 6/1981 | European Pat. Off. ........... 248/479 |
| 144224 | 9/1903 | Fed. Rep. of Germany ......... 16/49 |
| 2856612 | 7/1980 | Fed. Rep. of Germany ......... 248/486 |
| 3108627 | 10/1982 | Fed. Rep. of Germany . |
| 3220893 | 8/1983 | Fed. Rep. of Germany . |
| 60-151141 | 8/1985 | Japan ......................... 350/631 |

Primary Examiner—Alvin C. Chin-Shue
Attorney, Agent, or Firm—Fleit, Jacobson, Cohn, Price, Holman & Stern

[57] ABSTRACT

To reliably reduce the risk of injury in the return tilting of a mirror housing from a tilted end position into a position for normal use, the mirror housing initially swings against an overcomable stop, which ensures a safety distance between the lifted mirror housing edge and the mirror base. This safety distance is dimensioned such that a trapping of fingers between the mirror housing edge and the mirror base does not occur. The stop can only be overcome by the mirror housing by renewed application of force to the mirror housing, after which the mirror housing then tilts into the position for normal use.

1 Claim, 11 Drawing Sheets

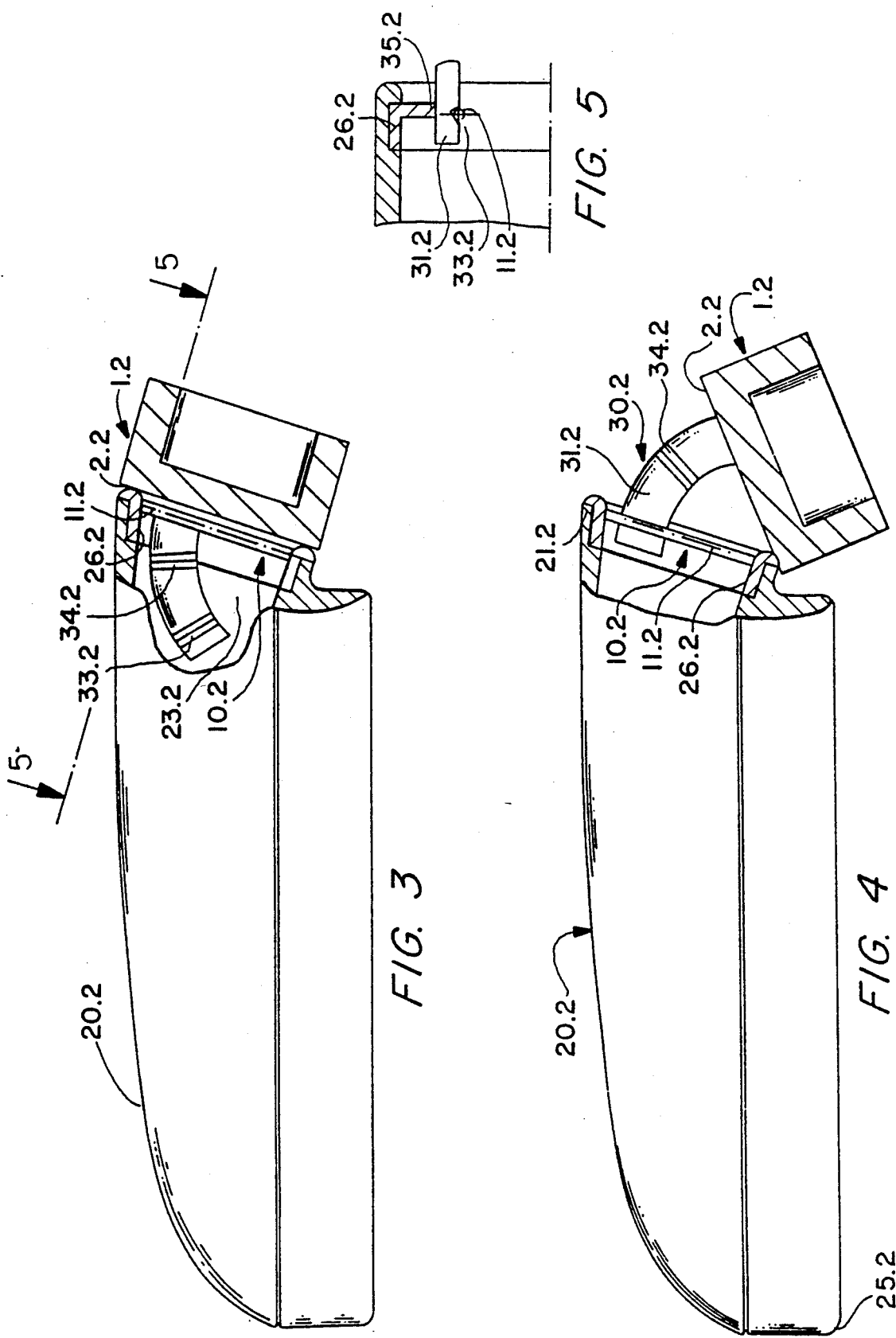

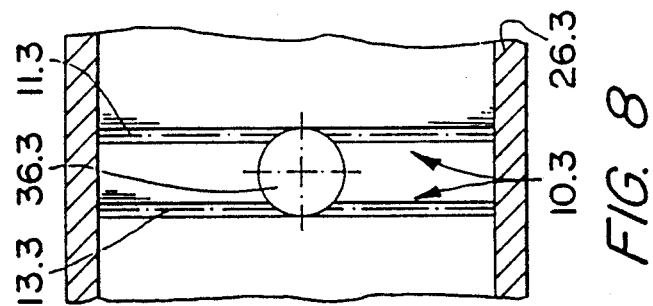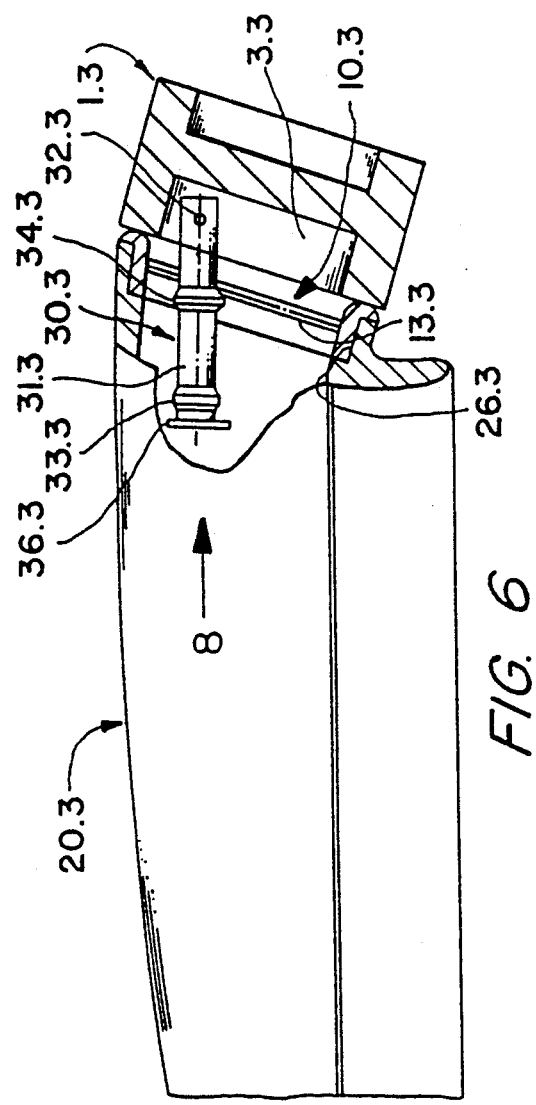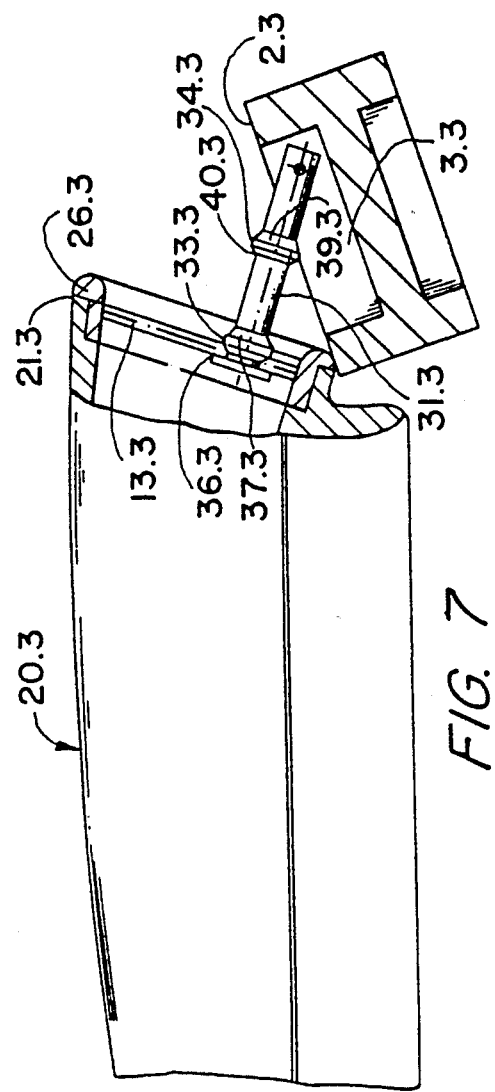

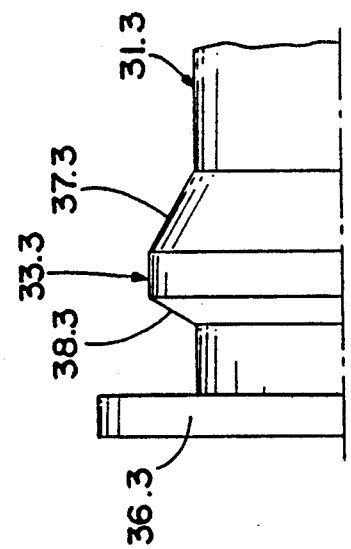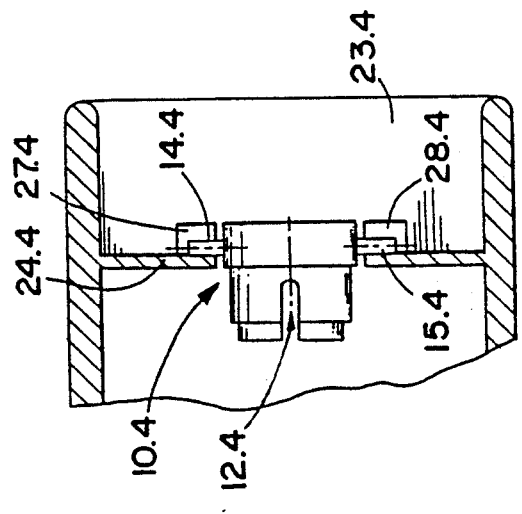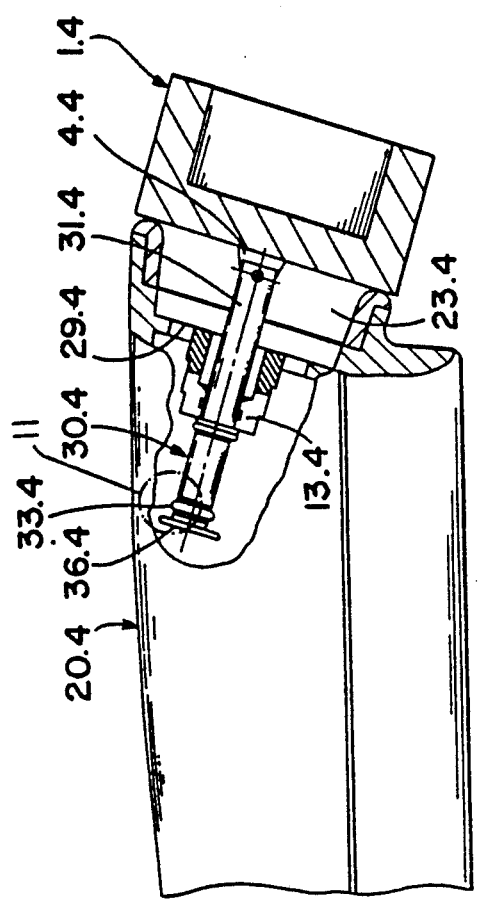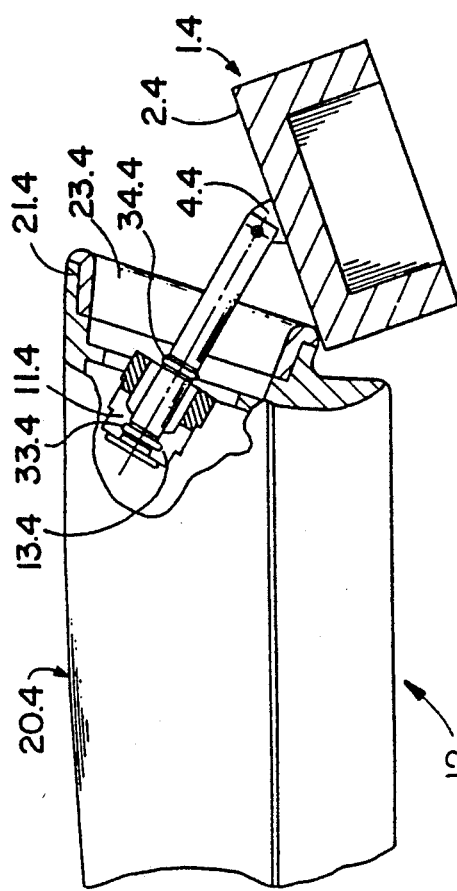

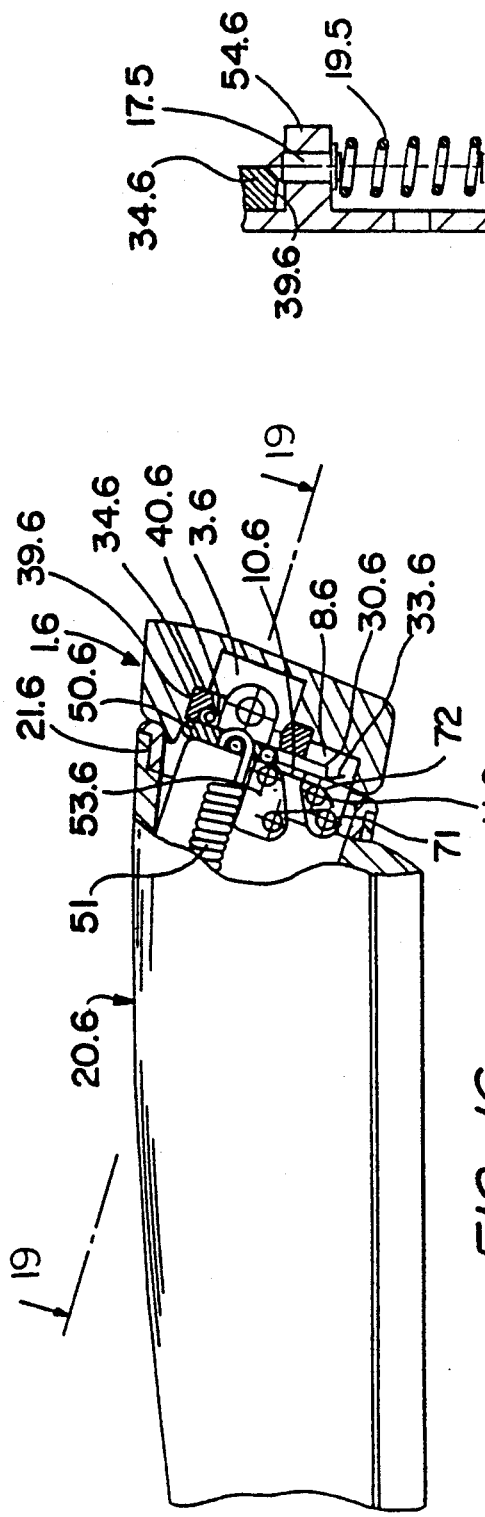
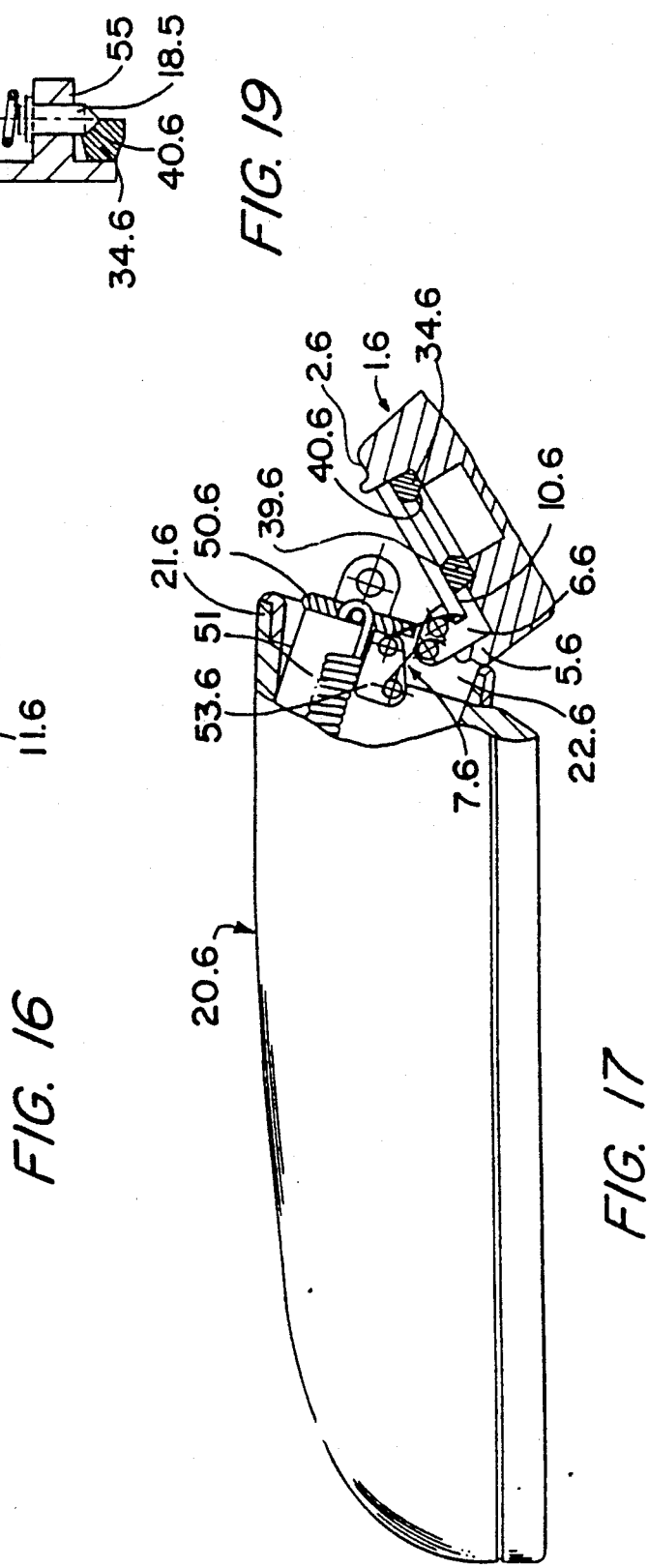
FIG. 19
FIG. 16
FIG. 17

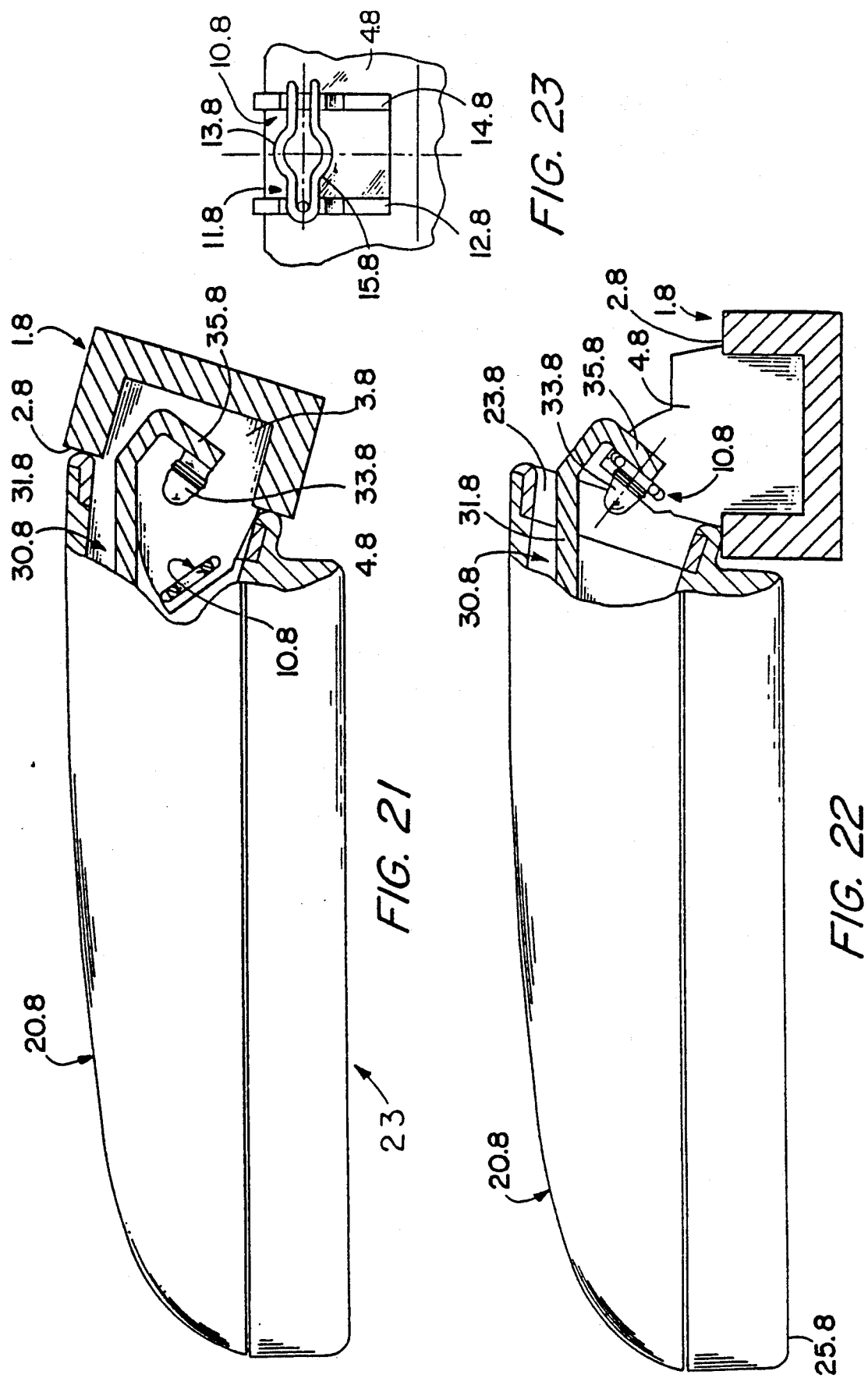

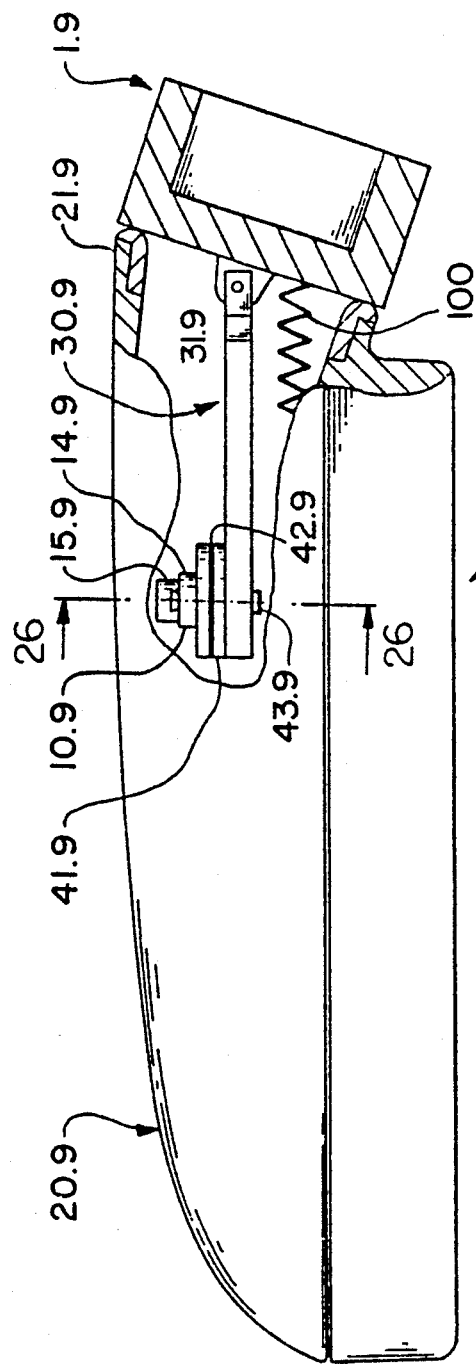
FIG. 24
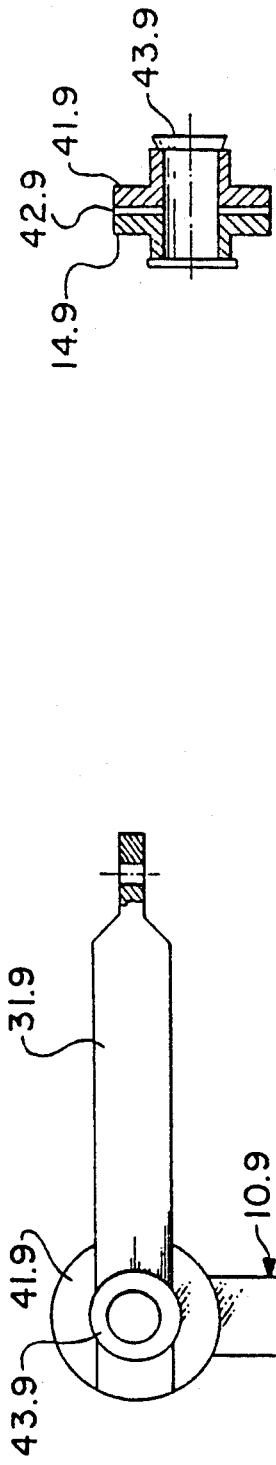
FIG. 26
FIG. 27
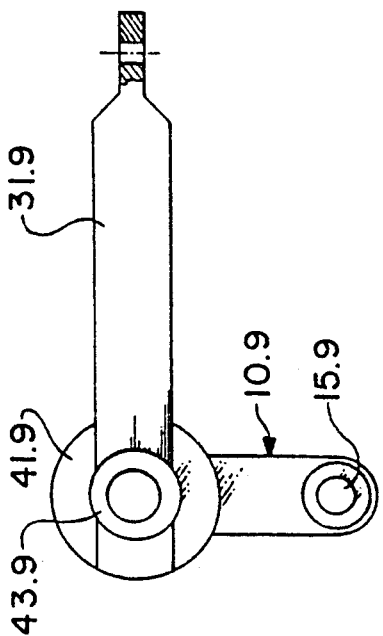

5,056,751

HOLDING DEVICE FOR A TILTABLE MIRROR FOR VEHICLES

This is a division of application Ser. No. 07/239,384, filed Sept. 1, 1988.

FIELD OF THE INVENTION

The invention relates to an outside mirror for a vehicle with a mirror base and a mirror housing capable of tilting forward and backward relative to the mirror base out of a position for use. The mirror housing is held in the position for use by means of a tension spring, a mirror housing edge bearing against the edge of a mirror base plate, and a catch member, which holds the tilted mirror housing in a defined end position.

BACKGROUND OF THE INVENTION

The outside mirror known from German Offenlegungsschrift 3,220,893 has a restraining lever articulated at the mirror base which bears against the rear inside wall of the mirror housing under the action of a spring when the mirror housing is in the position for use and projects into a catch position when the mirror housing is in the fully backward tilted position. In the catch position, the restraining lever grips underneath the mirror housing edge lifted off the mirror base and thereby prevents the return tilting of the mirror housing under the action of the tension spring stretched between the mirror base and mirror housing.

For disengagement, the restraining lever must be pressed manually backward so that the mirror housing immediately tilts back powerfully into the position for use. With this manual disengagement, there is the risk that the fingers may become trapped between the mirror housing edge and the mirror base plate.

SUMMARY OF THE PRESENT INVENTION

Therefore, it is the object of the present invention to improve the mechanism holding the tilted mirror housing in the defined end position such that there is minimal risk of injury due to trapped fingers or the like.

For this purpose, in the case of the outside mirror mentioned at the beginning, the invention provides that a catch element, which is spring-loaded and grips the catch member at least in the end position, is fixed to the mirror housing or to the mirror base in the path of the catch member This has the effect that the catch member and/or the catch element no longer have to be operated directly by hand to disengage the tilted mirror housing from the end position; a short forward blow by hand against the mirror housing, at best against its outer portions, is sufficient to make the mirror housing tilt back out of the end position into the position for use again.

To reliably exclude the risk of injury in the usual powerful return tilting of the mirror housing from the tilted end position into the position for use, an essential further development of the invention provides that during return tilting into the position for use, the mirror housing initially swings against an overcomable stop, which ensures a safety distance between the lifted mirror housing edge and the mirror base. This safety distance is dimensioned such that a trapping of fingers between the mirror housing edge and the mirror base does not occur. This feature of the invention is of significance in particular if the mirror housing should inadvertently free itself from its tilted end position, has, or reaches any undefined end position at all and then swings back in the direction of its position for use with whiplash effect. The stop can only be overcome by the mirror housing by renewed application of force to the mirror housing, after which the mirror housing then tilts into the position for use.

This further safety feature of the invention may be realized in various forms. For instance, it is recommended that the stop be formed on the catch member so that the mirror housing is held with the safety distance mentioned by the catch element running against the stop before assuming its position for use.

The invention makes a number of embodiments possible. For instance, the catch element may be anchored to the mirror base or to the mirror housing, in which case the catch member is then fixed to what is respectively the other component of the outside mirror; that is, to the mirror housing or mirror base. Furthermore, it is recommended as a first embodiment to give the catch element the form of an axially, double-conically drilled-through elastomeric insert, for example for an opening of the mirror housing on the mirror base side, the through-hole having a conical widened portion and the catch member being an arm which is made crowned at the end, is articulated at the mirror base and passes through the through-hole. In the tilted end position of the mirror housing, the crowned end is releasably captured in the conical widened portion. The arm bears, approximately in its middle, against the stop, which is a likewise crowned thickened portion which can releasably engage in the conical widened portion.

According to a second embodiment of the invention, the catch element has the form of a spring bar which spans the opening of the mirror housing on the mirror base side and straddles the upper side of a plate-shaped catch member fixed to the mirror base. The upper side of the plate-shaped catch member has at the free end a first groove, into which the spring bar enters when the mirror housing has reached the tilted end position. It is expedient if the plate-shaped catch member is gripped underneath by a rib projecting out of the mirror housing opposite the spring bar. Serving as a stop is a second groove for the spring bar, which is made in the upper side of the catch member, approximately in its middle.

The embodiment of the invention just mentioned may be designed in such a way that, instead of the rib, a second spring bar, spanning the housing opening on the mirror base side and extending parallel to the first spring bar, is provided so that the catch member then designed as a swivel arm is embraced by both spring bars. Formed on the catch member are two thickened portions, spaced apart and projecting radially in the direction of the two spring bars, of which thickened portions the outer one is gripped behind by the spring bars in the end position of the housing and the inner one serves as a stop, against which the spring bars run. Instead of the spring bars, alternatively a bush may be provided, which straddles the arm with play and which bears against it with spring segments.

According to a further embodiment, the catch element is a disk, pivotally fixed to the mirror housing and with an axially projecting lug, which bears under spring-loading against a disk, provided with a groove corresponding to the lug, at the free end cf a catch member designed as a swivel arm. The tilted end position is obtained when the lug is releasably captured in the groove. Both disks are expediently mounted of a common pin and are axially loaded by a cup spring provided on the pin. In this arrangement, the axis of the pin expediently runs substantially transverse to a plane which is defined by an opening of the mirror housing enclosing the mirror glass of the outside mirror.

This embodiment of the invention may be modified in the manner that, instead of the lug with associated groove, a friction disk is interposed between the two disks of the catch element and of the catch member, allowing the axial spring-loading to be dispensed with. The pin holds the disk assembly together under such a pressure that the static friction between at least one surface of the friction disk and the opposite surface of the disk of the catch element or of the catch member is greater than the return force of the tension spring for the mirror housing so that the mirror housing is held in the tilting end position reached, the catch element and the catch member forming a substantially straight angle with each other.

BRIEF DESCRIPTION OF THE DRAWINGS

The invention is described below in detail with reference to a number of exemplary embodiments, reference being made to the enclosed drawings, in which:

FIG. 3 shows a representation similar to FIG. 1 of a second embodiment with mirror housing in the position for use;

FIG. 4 shows a representation similar to FIG. 2 of the embodiment according to FIG. 4, the mirror housing being held in the backward-tilted end position;

FIG. 5 shows the view of section C—C from FIG. 3, for the explanation of a detail;

FIG. 6 shows a representation similar to FIG. 1 of a third embodiment, in which the mirror housing is in the position for use;

FIG. 7 shows a representation similar to FIG. 2 of the third embodiment, the mirror housing being held in the backward-tilted end position;

FIG. 8 shows a partial view from direction U in FIG. 6;

FIG. 9 shows a representation similar to FIG. 1 of a fourth embodiment, in which the mirror housing is in the position for use;

FIG. 10 shows a representation similar to FIG. 2 of the fourth embodiment, in which the mirror housing is held in the backward-tilted end position;

FIG. 11 shows the enlarged representation of a detail according to the cutaway section W from FIG. 9;

FIG. 12 shows an enlarged representation of the catch element from direction V in FIG. 10;

FIG. 16 shows a representation similar to FIG. 1 of a sixth embodiment, in which the mirror housing is in the position for use;

FIG. 17 shows a representation similar to FIG. 2 of the sixth embodiment, in which the mirror housing is held in the backward-tilted end position;

FIG. 19 shows an enlarged representation of a detail in the section A—A from FIG. 16;

FIG. 21 shows a representation similar to FIG. 1 of an eighth embodiment;

FIG. 22 shows a representation similar to FIG. 2 of the eighth embodiment,

FIG. 23 shows a diagrammatic enlarged view of a detail from the direction Z according to FIG. 21;

FIG. 24 shows the representation corresponding to FIG. 1 of a ninth embodiment, in which the mirror housing is in the position for use;

FIG. 26 shows the diagrammatic representation of a detail in section along the line E—E from FIG. 24;

FIG. 27 shows an enlarged representation of a detail in view from direction Y according to FIG. 24;

DESCRIPTION OF THE PREFERRED EMBODIMENTS

Figure 1:
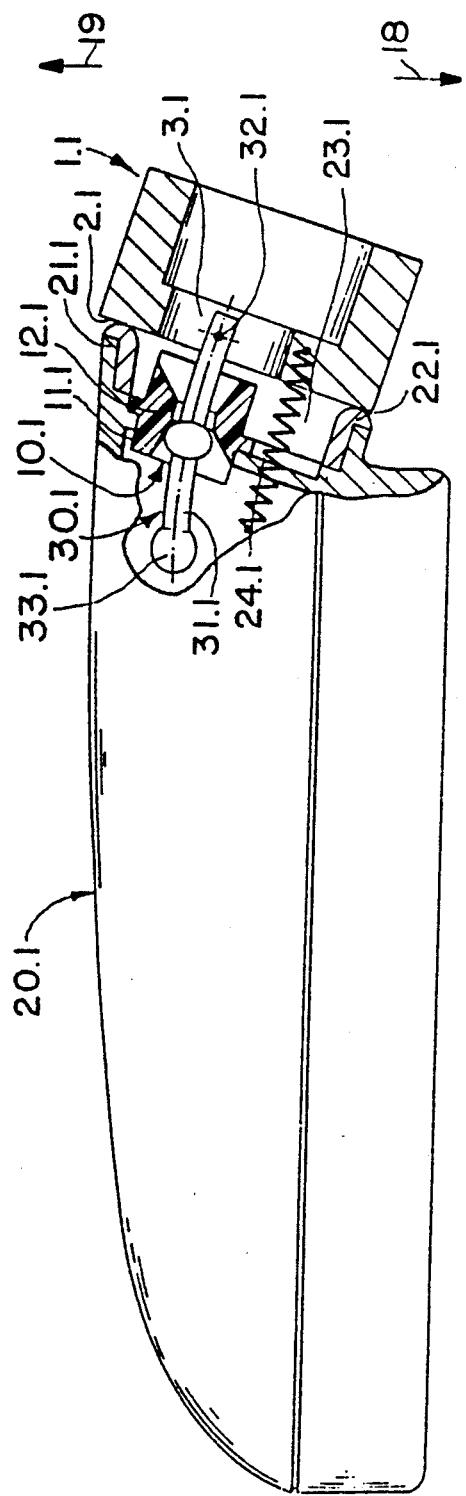
FIG. 1 shows the plan view of a mirror housing in the position for use, the end of which on the mirror base side is in horizontal section, the mirror base being indicated diagrammatically.

In the exemplary embodiments described below for an outside mirror, the functionally identical parts are provided with reference numerals whose number before the decimal point is the same and whose number after the decimal point is assigned to the respective embodiment.

Furthermore, the mirror base is in each case only represented diagrammatically as a hollow block. Apart from the special features mentioned in detail, it has the usual form.

Thus, the mirror base 1.1 of the first embodiment has a continuous edge portion 2.1, against which the edge of the mirror housing 20.1 bears in its position for use. In the horizontal sections represented, the front edge section 21.1 and the rear edge section 22.1 are rounded off at their end so that, in the tilting of the mirror housing forward (arrow 19 in FIG. 1) or backward (arrow 18, FIG. 1), they can roll on the respective part of the edge portion 2.1.

Not represented is a usual tension spring, the one end of which is anchored to the mirror base 1.1 and the other end of which is anchored to the mirror housing 20.1 and which ensures both secure retention of the mirror housing 20.1 in the position for use on the mirror base 1.1 and its return into the position for use after tilting forward or backward.

Inside the region enclosed by the edge portion 2.1, the mirror base 1.1 has a slot 3.1, in which a slightly backwardly bent arm 31.1 of a catch member, denoted generally by 30.1, is held pivotally forward and backward about a pin 32.1 extending parallel to the tilt axis of the mirror housing 20.1. The arm 31.1 has at its free end, which, in the position for use of the mirror housing according to FIG. 1, projects into the inside of the latter, has a crowned thickened portion 33.1. Approximately midway between the pin 32.1 and the crowned thickened portion 33.1, there is located a further crowned thickened portion serving as stop 34.1.

The mirror housing 20.1 has an opening 23.1 on the mirror base side, which opening is closed off at the sides by the continuous edge with edge sections 21.1, 22.1 and from the inside of the mirror housing 20.1 by a wall 24.1. The wall 24.1 has an opening, in which a cylindrical plastic body 11.1 is held as a catch element, denoted generally by 10.1. The plastic body 11.1 has an axial through-opening, which is widened conically to both opposite sides and in the middle has a conically shaped widened portion 12.1. The plastic body 11.1 is radially flexible, at least in the region of the widened portion 12.1. The widened portion 12.1 is shaped such that it positively encloses the crowned thickened portion 33.1 and the stop 34.1 when the latter engage in the widened portion 12.1 in backward-tilting of the mirror housing 20.1 or return-tilting.

Figure 2:
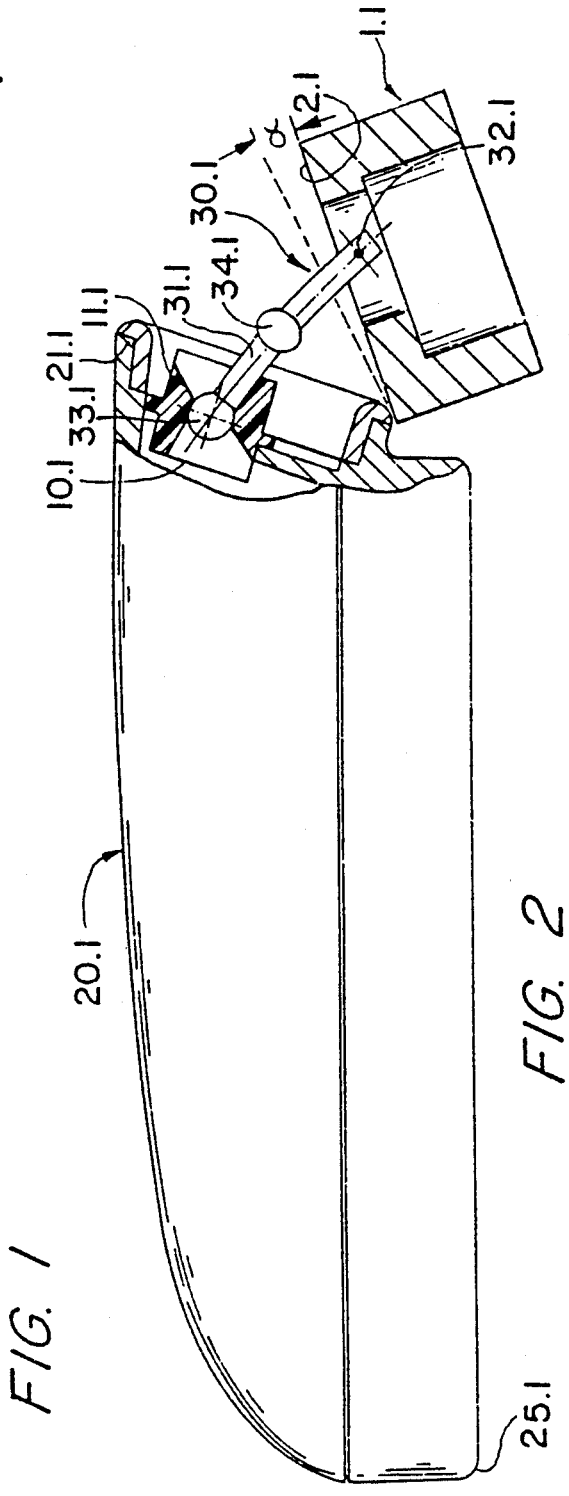
FIG. 2 shows a representation similar to FIG. 1, but with the mirror housing held in the end position of the backward-tilted mirror housing.

According to FIG. 2, the rear end position of the backward-tilted mirror housing 20.1 is defined by engagement of the thickened portion 33.1 into the widened portion 12.1. From this end position, the mirror housing 20.1 can be freed by a forward blow round about its outer edge 25.1, whereupon the mirror housing 20.1 tilts under the action of the tension spring mentioned previously in the direction of its position for use. If, during the forward-swinging of the mirror housing 20.1, the crowned stop 34.1 is captured in the widened portion 12.1, the mirror housing 20.1 remains in a position relative to the mirror base 1.1 in which the forward, lifted edge section 21.1 maintains the safety distance d with respect to the neighboring edge portion 2.1 of the mirror base 1.1. The safety distance d may be about 2 cm and is intended to prevent the possibility of fingers becoming entrapped between the front edge section 21.1 and the neighboring edge portion 2.1. A renewed forward blow on the mirror housing 20.1 frees the stop 34.1 from the widened portion 12.1 and the mirror housing tilts into the position for use.

In the second exemplary embodiment of the invention, represented in FIGS. 3–5, the catch member 30.2 is designed as a backwardly bent locking plate 31.2 which is fixed to the mirror based 1.2 and protrudes into the mirror housing 20.2, and which extends between a web 35.2 and a spring bar 11.2 as catch element 10.2. The web 35.2 rises from below out of an insert ring 26.2, which is inserted in the opening 23.2 on the mirror base side, and grips underneath the locking plate 31.2 opposite the spring bar 11.2. The spring bar 11.2 spans the opening 23.2 and is anchored at its opposite ends in the insert ring 26.2 such that, as is apparent below, it is movable transversely to the locking plate 31.2 by bending.

The locking plate 31.2 has, in its surface facing the spring bar 11.2, two notches 33.2, 34.2, of which the first notch 33.2 is formed in the vicinity of the free end of the locking plate 31.2 and the second notch 34.2 is formed as a stop approximately in the middle of the locking plate 31.2.

Although not represented in FIGS. 3 to 5, a wall bounding the opening 23.2 to the inside of the mirror housing 20.2 and with an opening for the passage of the locking plate 31.2 may be provided. If the mirror housing 20.2 is tilted backward by the application of force from a forward position against the action of the tension spring, not shown, the spring bar 11.2 rides along the upper side of the locking plate 31.2 in the direction of its free end. If the spring bar 11.2 drops into the outer, first notch 33.2, the rear end position of the tilted housing 20.2 is reached, which housing remains held in this position by interaction of the spring bar 11.2 with the first notch 33.2. To free the housing 20.2 from the rear tilted end position, a forward blow is imparted to its end 25.2 remote from the mirror base, which blow frees the spring bar 11.2 from the first notch 33.2, so that the housing 20.2 swings under the action of the tension spring toward the mirror base 1.2 until the spring bar 11.2 drops into the second notch 34.2. In this position, the mirror housing 20.2 is securely held again, its front edge section 21.2 maintaining the safety distance d from the edge portion 2.2 in a way not shown. A renewed forward blow on the outer edge 25.2 can free the spring bar 11.2 from the second notch 34.2 and the mirror housing returns under the action of the tension spring into the position for use represented in FIG. 3.

In the case of the third exemplary embodiment of the invention, represented in FIGS. 6 to 8, the catch member 30.2 is again an arm 31.3 which is articulated at the mirror base 1.3 and is pivotal about an axis parallel to the tilt axis of the mirror housing 20.3. For this purpose, the mirror base 1.3 has a recess 3.3, in which the arm 31.3 is pivotally held by a pin 32.3. Similar to the case of the second embodiment, a first spring bar 11.3, which is not entered in FIGS. 6 and 7 to simplify the representation but can be seen in FIG. 8, grips over the arm 31.3. Parallel to the first spring bar 11.3, there extends underneath the arm 31.3, a second spring bar 13.3 which, like the first spring bar, is held at opposite ends in an insert ring 26.3. The two spring bars 11.3 and 13.3 together form the catch element 10.3. The arm 31.3 extending through between the two spring bars 11.3 and 13.3 has, in the vicinity of its free end, a radial thickening 33.3, the form of which is shown in FIG. 11. At the end, the arm 31.3 terminates in a radially widened stop plate 36.3, the radial dimension of which is greater than the greatest possible intermediate space between the upwardly and downwardly resiliently compliant spring bars 11.3 and 13.3. Formed approximately in the middle of the arm 31.3 as a stop is a further thickened portion 34.3, which has a similar cross-sectional shape as the rear thickened portion 33.3.

The backward-tilted mirror housing 20.3 is held in the rear end position by the spring bars 11.3 and 13.3 remaining captured between the rear thickened portion 33.3 and the stop plate 36.3. The engagement of the spring bars 11.3 and 13.3 behind the rear thickened portion 33.3 is facilitated by a relatively flat run-up slope 37.3, facing the mirror base 1.3, compared with which slope the run-up slope 38.3 facing away from the mirror base 1.3 has a much steeper incline. The mirror housing 20.3 can again be freed from the tilted end position by a forward blow on its outer end, enabling the spring bars 11.3 and 13.3 to pass over the rear thickened portion 33.3 by deviating to the side. The tension spring swings the mirror housing 20.3, freed from the tilted end position, in the direction of its position for use, until the two spring bars 11.1 and 13.3 run up against the steep run-up slope 40.3 of the stop 34.3, facing away from the mirror base 1.3. The mirror housing 20.3 is held in this position, in which the lifted front edge section 21.3 maintains the safety distance d with respect to the neighboring edge portion 2.3. A renewed forward blow causes the spring bars 11.3 and 13.3 also to brush over the stop 34.3 by deviating to the side, whereupon the mirror housing 20.3 returns to the position for use represented in FIG. 6. As shown, the stop 34.3 has a run-up slope 39.3 close to the mirror base of substantially smaller incline than the run-up slope 40.3 remote from the mirror base. It can be appreciated from this exemplary embodiment of the invention that the mirror housing cannot be swung beyond the tilted end position, which is prevented by the stop plate 36.3 so that the arm 31.3 constantly remains captured between the spring bars 11.3 and 13.3.

In the case of the fourth embodiment of the invention, represented in FIGS. 9–12, a catch member 30.4, which resembles the catch member 30.3, is provided. To avoid repetitions, reference can be made to the description above of the catch member 30.3 also for this exemplary embodiment. In the case of the fourth exemplary embodiment, the catch member 30.4 is fixed pivotally to an ear 4.4 projecting from the mirror base 1.4 in the direction of the mirror housing 20.4. The essential difference from the embodiment of the invention described above is a different design of the catch element 10.4. While in the third embodiment the catch element 10.3 is formed by the two parallel spring bars 11.3 and 13.3, in the fourth embodiment, the catch element 10.4 consists of an axially drilled-through bush which is mounted pivotally in a wall 24.4, bounding the opening 23.4 on the mirror base side from the inside of the mirror housing 20.4, by means of laterally protruding opposite pins 14.4, 15.4, accommodated in bearings 27.4, 28.4 made in the wall 24.4. The bush-shaped catch element 10.4 projects into the inside of the mirror housing 20.4, and its ability to pivot is ensured by an opening 29.4 in the wall 24.4. The bush-shaped catch element 10.4 is axially drilled-through and surrounds the arm 31.4 of the catch member 30.4 at a distance. The catch element 10.4 has four catch segments evenly distributed around the circumference of the arm 31.4, of which segments the catch segments lying opposite in the sectional view of FIG. 10 are denoted by 11.4, 13.4. The catch segments are radially flexible due to axial incisions 12.4 in the bush body. All catch segments bear against the periphery of the arm 31.4 and are shaped on their end face facing the arm 31.4 such that they can positively grip between themselves the thickened portion 33.4 and/or the stop 34.4, as can be seen from the catch segments 11.4 and 13.4.

If the mirror housing 20.4 tilts backward out of the position for use represented in FIG. 9, the catch segments on the periphery of the catch member 30.4 move along in the direction of its free end until they prevent a further backward tilting of the mirror housing 20.4 by running against the stop plate 36.4. At the same time, as FIG. 10 shows by the catch segments 11.4, 13.4, all catch segments positively grip the rear thickening 33.4, so that the mirror housing 20.4 is held in the tilted end position. From this position, the mirror housing 20.4 can be freed by the forward blow mentioned, until the catch segments grip the stop 34.3 between themselves. In this position, the lifted front edge section 21.4 maintains the safety distance d with respect to the neighboring edge portion 2.4 of the mirror base 1.4. A further forward blow makes the mirror housing 20.4 return under the action of the tension spring mentioned to its position for use according to FIG. 9.

Figure 15:
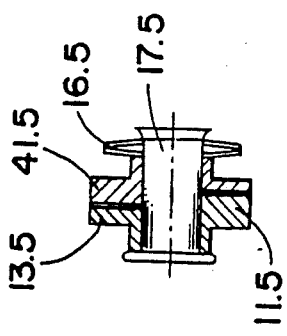
FIG. 15 shows an enlarged detailed representation of a detail in the section B—B from FIG. 14.
Figure 13:
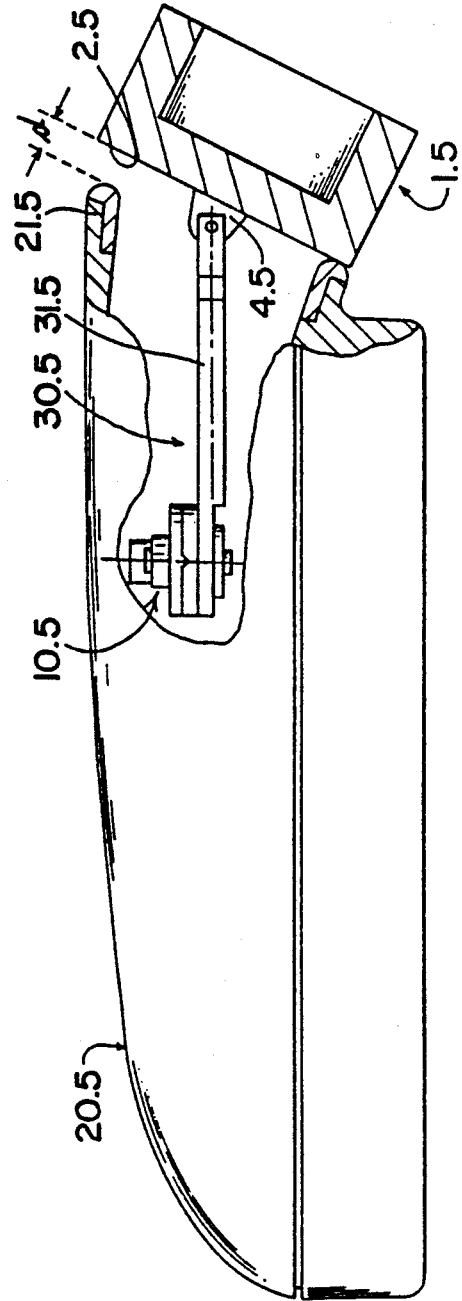
FIG. 13 shows a representation similar to FIG. 1 of a fifth embodiment, in which the mirror housing is held at the safety distance.
Figure 14:
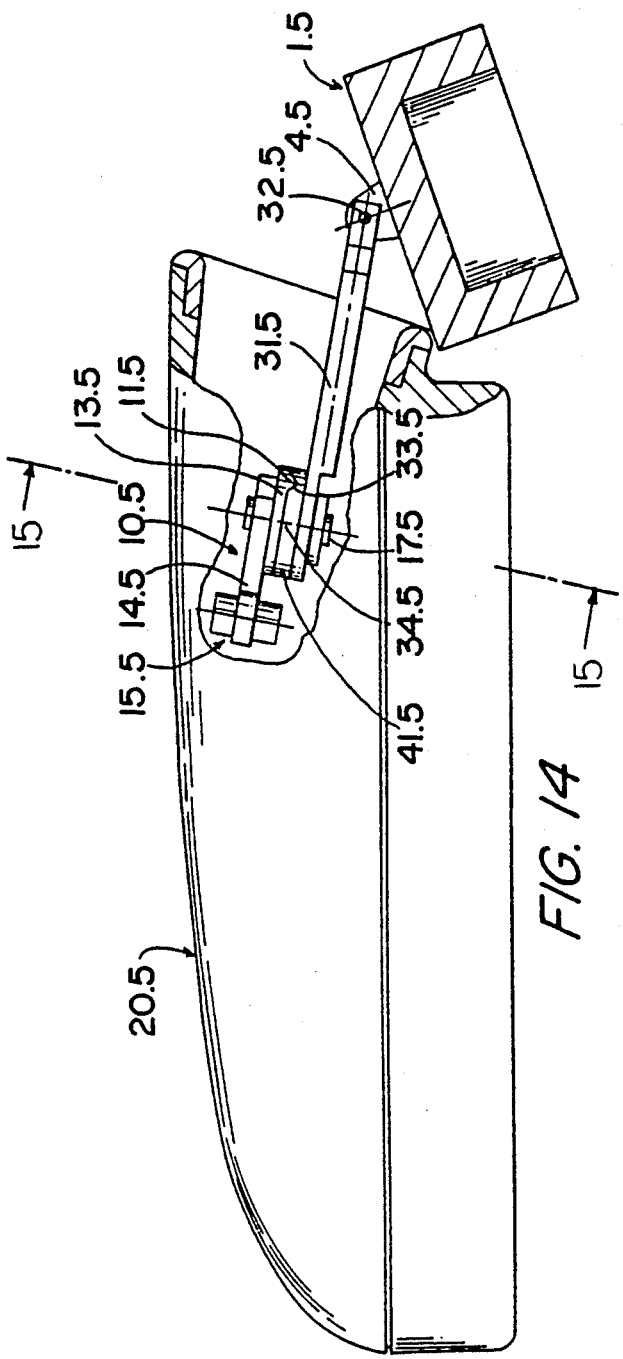
FIG. 14 shows a representation similar to FIG. 2 of the fifth embodiment.

In the case of the fifth exemplary embodiment of the outside mirror, represented in FIGS. 13 to 15, the catch member 30.5 is an arm 31.5 articulated at the mirror base 1.5 by means of an ear 4.5 and a pin 32.5, which arm is movable about an axis parallel to the tilt axis of the mirror housing 20.5 and limiting upward and downward movement relative to the mirror base 1.5. At its free end protruding into the inside of the mirror housing 20.5, a locking disk 41.5 is integrally attached, facing forward, in the forward-facing flat surface of which two notches 33.5, 34.5, circumferentially spaced apart, are made.

The catch element 10.5 has a relatively short arm 14.5, which is fixed at one end pivotally about a vertical and a horizontal axis via a joint 15.5 on the inside of the mirror housing 20.5. At the other end, the arm 14.5 is widened into a second disk 13.5, which has the same radius as the locking disk 41.5. From the flat surface of the disk 13.5 facing the locking disk 41.5 there protrudes a lug 11.5, the contour of which is adapted to the notches 33.5, 34.5. The disk 13.5 and the locking disk 41.5 are penetrated axially in the center by a hollow rivet 17.5 on which a spreading spring 16.5, acting axially on the disks 13.5 and 41.5, is mounted.

If the mirror housing 20.5 tilts backward out of the position for use, against the action of the tension spring (not represented), the locking disk 41.5 and the disk 13.5 turn relative to each other about the rivet 17.5 until the lug 11.5 has dropped into the first notch 33.5 under the action of the spring 16.5. The tilted mirror housing 20.5 is, according to FIG. 14, held in this end position until a forward blow on the mirror housing 20.5 frees the lug 11.5 from the first notch 33.5, and the mirror housing returns under the action of the tension spring in the direction of its position for use. Along this path, the lug 11.5 drops into the second notch 34.5, acting as a stop, and holds the mirror housing 20.5, according to FIG. 13, such that the front edge section 21.5 maintains the safety distance d mentioned with respect to the opposite edge portion 2.5. A further blow on the mirror housing 20.5 brings the lug 11.3 out of the second notch 34.5 so that the mirror housing can return to its position for use, in which the front edge section 21.5 is on the associated edge portion 2.5. It goes without saying that the form of the notches 33.5 and 34.5 may be shaped asymmetrically approximately corresponding to the different inclines of the run-up slopes 37.3, 38.3. The movements of the arm 14.5 during the tilting movement of the mirror housing 20.5 are made possible by the joint 15.5.

Figure 18:
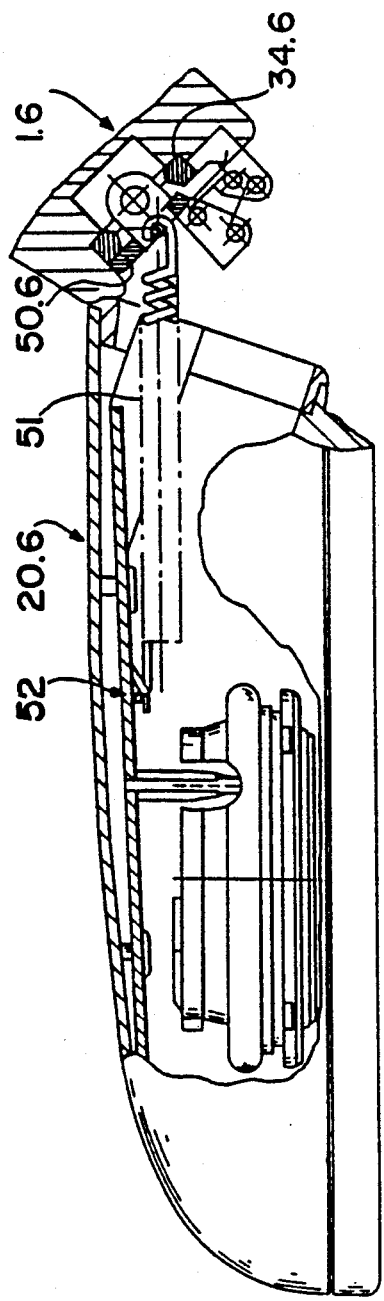
FIG. 18 shows a representation similar to FIG. 2 of the sixth embodiment, but in which the mirror housing is tilted forward.

In the case of the sixth exemplary embodiment of the outside mirror, represented in FIGS. 16 to 19, the mirror housing 20.6 is connected to the mirror base 1.6 via an intermediate plate 50.6, on which a tension spring 51 acts with one end. The other end of the tension spring 51 is anchored on the mirror housing 20.6 at 52 (FIG. 18). The intermediate plate 50.6 is provided with a tang 53.6, projecting behind the tension spring 51 in the direction of the mirror housing 20.6. In the direction of the mirror base 1.6, two posts 54.6 and 55 project out of the intermediate plate 50.6, which posts enter a recess 3.6 in the mirror base 1.6 in the position for use of the mirror housing 20.6 (FIG. 16).

On the rear edge portion 5.6 of the mirror base 1.6 there projects parallel to the tang 53.6 a link plate 6.6. The tang 53.6 and the link plate 6.6 are interconnected via a double-hinge joint 7.6, which is known in its basic design from the hinge fittings for furniture doors. The hinge 7.6 lends the mirror housing 20.6 the possibility of pivoting about two hinge pins 71, 72, offset transversely to the swivel axis, on the link plate 6.6, with the advantage that the rear edge section 22.6 of the mirror housing edge no longer rolls on the edge portion 5.6 in tilting.

The depressing 3.6 of the mirror base 1.6 is widened in the direction of the mirror housing 20.6 for receiving a stop body 34.6, which has a through-opening for the passage of the posts 54.6, 55. On the rear part of the outside surface of the stop body 34.6, there is mounted a strong leaf spring 30.6, bent at the end to form a lug 33.6 pointing toward the mirror housing 20.6, which leaf spring is accommodated in a niche 8.6, open toward the mirror housing 20.6. Of the hinge bands belonging to the hinge joint 7.6, the hinge band 10.6 neighboring the leaf spring 30.6 has a projecting boss 11.6 on the associated joint pin 72 mounted on the link plate 6.6.

If the mirror housing 20.6 tilts backward, its tilted end position is reached when the boss 11.6 has slid over the lug 33.6, with corresponding deflection of the leaf spring 30.6 and grips behind the latter as FIG. 17 shows. As a result, the mirror housing 20.6 is held in the tilted end position until it is freed from this position by the forward blow mentioned.

The stop body 34.6 has a relatively steep outer run-up surface 35.6 and an inner, flatter run-up surface 40.6 which bound the clearance through the stop body 34.6 on both opposite sides. On the other hand, the posts 54.6 and 55 are drilled-through in axial alignment so that a catch body 17.5, 18.5 can be inserted axially displaceably in each of the through-holes. A spiral spring 19.5 is supported between the two inner widened portions of the catch bodies 17.5 and 18.5. Both catch bodies 17.5, 18.5 are, as FIG. 19 shows, rounded off conically at their ends projecting out of the axially aligned holes in the posts 54.6 and 55.

If, after freeing from its rear end position, the mirror housing 20.6 is swung back under the action of the tension spring (not represented) in the direction of its position for use, the catch bodies 17.5, 18.5 meet with their conical ends the opposite steep run-up surfaces 39.6 of the catch body 34.6 so that the mirror housing is held securely before the final return to its position for use in such a way that the safety distance d mentioned is maintained between the front edge section 21.6 and the opposite edge portion 2.6. Only after a further forward blow are the catch bodies 17.5, 18.5 urged axially inward against the action of the spring 19.5 so that the posts 54.6, 55 of the intermediate disk 50.6 can enter the recess 3.6, and the catch bodies 17.5, 18.5 bear against the inner run-up slope 40.6, as shown in FIG. 19.

FIG. 18 shows the mirror housing 20.6 in a position tilted forward relative to the mirror base, in which position the tension spring 51 is stretched, and the intermediate plate 50.6 remains in its contact with the stop body 34.6.

Figure 20:
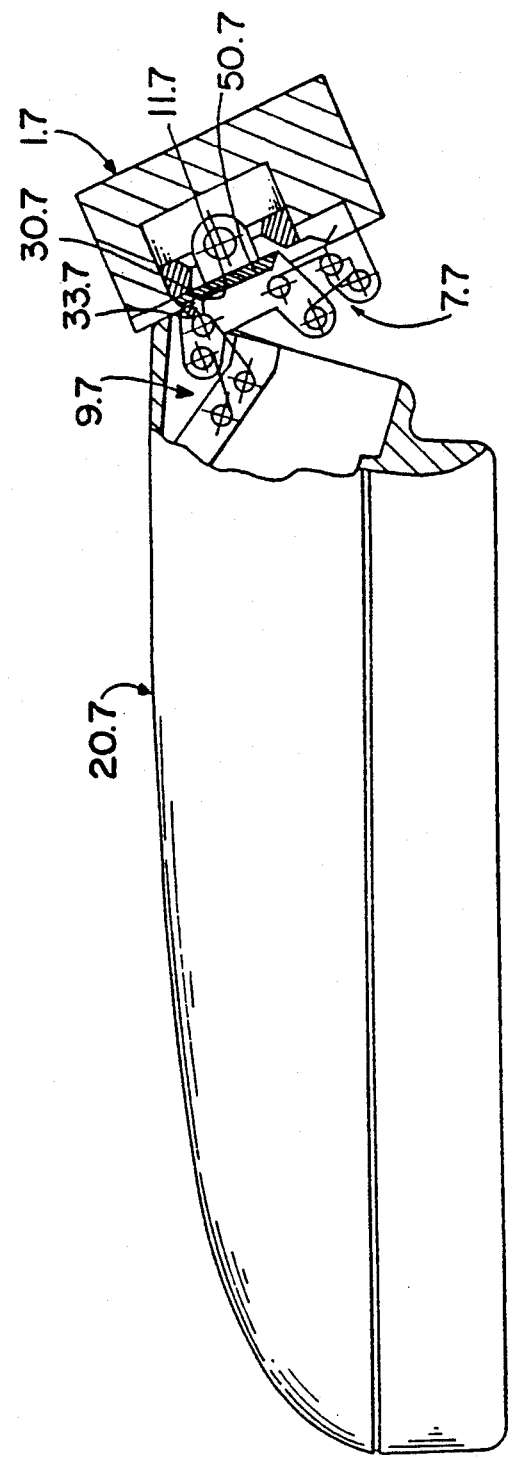
FIG. 20 shows a representation similar to FIG. 18 of a seventh embodiment, in which the mirror housing is tilted forward.
Figure 25:
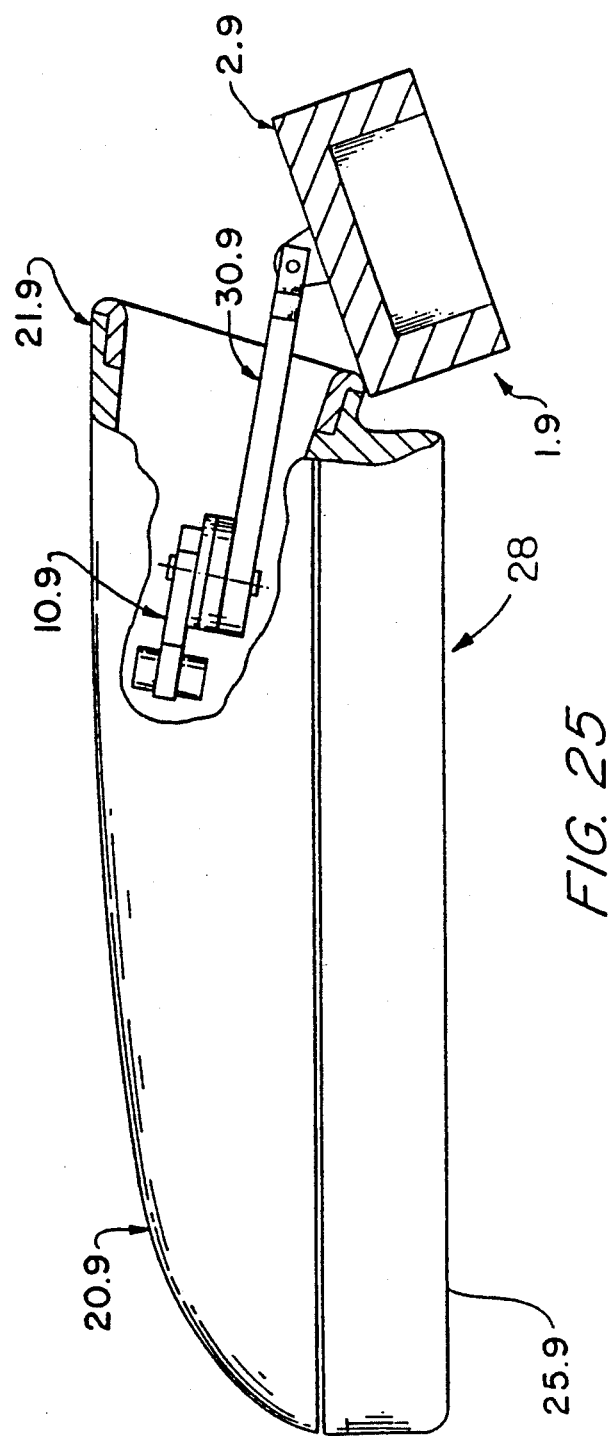
FIG. 25 shows a representation similar to FIG. 2 of the ninth embodiment, in which the mirror housing is held in the backward-tilted end position.

In order also to create a forward defined end position in forward tilting of the mirror housing 20.7, FIG. 20 shows a seventh embodiment of the outside mirror, in which, in comparison with the sixth embodiment, the tension spring 51 is replaced by a double hinge joint 9.7. The front joint 9.7 and the rear joint 7.7 correspond in their design to the joint 7.6 from the sixth embodiment. Similarly to the latter, here too the hinge band neighboring the mirror base 1.7 is provided with a radially projecting boss 11.7 which, in the forward end position of the mirror housing 20.7, engages behind a lug 33.7, projecting in the direction of the mirror housing 20.7, of a leaf spring 30.7, fixed here to the intermediate plate 50.7. Otherwise, the seventh embodiment is the same as the previously described sixth embodiment of the outside mirror.

The further three exemplary embodiments of an outside mirror explained below do not initially provide any stop against which the mirror housing could be held on return to its position for use from a tilted end position, maintaining the safety distance d. Nevertheless, the risk of injury in the case of these embodiments is already excluded solely by the fact that there is no need to reach into the region between the lifted mirror housing edge section and the opposite part of the edge portion of the mirror base to release the mirror housing In the case of the eighth embodiment represented in FIGS. 21 to 23, the mirror base 1.8 is provided between its edge portions 2.8 with a depression 3.8, open towards the mirror housing 20.8 The depression 3.8 serves to receive the end, on the mirror base side, of a catch member 30.8, firmly anchored in the mirror housing (20.8) to the latter in a way not shown, in the position for use of the mirror housing 20.8 represented in FIG. 21. Vertically next to the depression 3.8, a holding plate 4.8 projects out of the mirror base 1.8 into an opening 23.8 on the mirror base side, which holding plate bears a catch element 10.8, still to be described and represented in FIG. 23 from direction Z.

The catch member 30.8 here consists of an elongate arm 31.8, the unrepresented end of which is firmly riveted or correspondingly fixed to the inside of the bottom of the mirror housing 20.8. The end of the arm 31.8 on the mirror base side and protruding out of the opening 23.8 is cranked twice in such a way that the end section 35.8 points rearward toward the opening 23.8, as represented. On the end section 35.8 there is mounted a dome-shaped catch body 33.8, pointing toward the opening 23.8, which catch body is undercut at its transition to the end section 35.8.

The catch element 10.8 has a hairpin spring 11.8, held in two spaced apart supports 12.8, 14.8 and with two parallel legs 13.8, 15.8. The legs 13.8, 15.8 are bulged outward in each case between the supports 12.8, 14.8 so that the head of the catch body 33.8 can slip through into the intermediate space between the legs 13.8, 15.8, widening the same.

If the mirror housing 20.8 is tilted backward against the action of the tension spring, the catch member 30.8 follows the tilting movement. The catch body 33.8 of the latter finds in its path the widened portion between the two legs 13.8, 15.8 of the catch element 10.8 and penetrates these so that the legs drop into the undercut of the catch body 33.8. Consequently, the rear end position of the backward tilting movement of the mirror housing 20.8 is defined. To release the mirror housing 20.8 from the rear end position, again a short forward blow is exerted on its outer edge 25.8, whereupon the legs 12.8, 14.8 come free from the undercut of the catch body 33.8 and the mirror housing returns to its position for use under the action of the tension spring.

This eighth embodiment of the invention may be provided in a simple way with a stop, for instance, by fixing a component similar to the catch element 10.8 inside the depression 3.8 and fitting a corresponding catch body on the end of the catch member opposite the catch body 33.8.

The ninth embodiment of an outside mirror, represented in FIGS. 24 to 28, is similar to the fifth embodiment in that two disks are in constant surface engagement with each other. Thus, the catch element 10.9 is articulated about two mutually perpendicular axes by means of a joint 15.9 inside the mirror housing 20.9 and is provided at the free end with a disk 14.9. On the other hand, the catch member 30.9, which, like the catch member 30.5, is jointedly fixed to the mirror base 1.9 via an arm 31.9, has at the free end reaching into the inside of the mirror housing 20.9 a locking disk 41.9. The two disks 14.9 and 41.9 are mounted on a common rivet 43.9, passing axially through them a friction plate 42.9 being interposed between the two equal height and sized disks 14.9 and 41.9. The disks 14.9 and 41.9 are pressed on both sides against the friction plate 42.9 by the rivet 43.9 with such a force that the tensile force of the tension spring 100 in each forward-tilting position of the mirror housing 20.9 is not quite enough to overcome the static friction between the friction plate 42.9 and the disk 14.9 or the locking disk 43.9, respectively.

Figure 28:
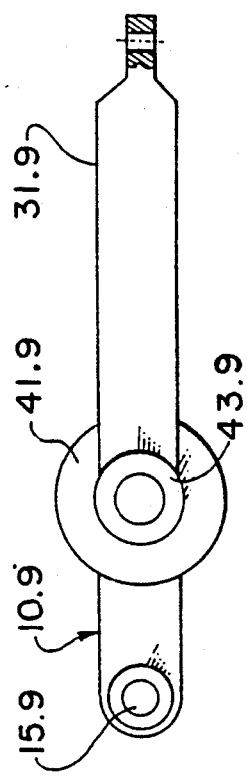
FIG. 28 shows an enlarged representation of the detail from FIG. 27, but in view X from FIG. 25.

In the position for use of the mirror housing 20.9, the arm 31.9 and the catch element 10.9 substantially form a right angle (FIG. 27). During the backward tilting of the mirror housing 20.9, the angle formed by the catch member 30.9 and the catch element 10.9 increases and, in the rear end position of the mirror housing 20.9, assumes virtually a straight angle (FIG. 28). In this case, a projection, not represented in detail, may be provided on the catch element (10.9), which projection prevents the assumption of a straight angle between catch element 10.9 and catch member 30.9. The rear end position is then reached when the catch member 30.9 comes into contact with the projection of the catch element 10.9.

The mirror housing 20.9 can be freed from the rear end position (FIG. 25) by a forward blow on the remote end 25.9, which blow imparts on the mirror housing an impetus of such magnitude that the static friction between the disks 14.9 and 41.9, on the one hand, and the friction plate 43.9, on the other hand, is overcome by the impetus and the tensile force of the tension spring 100, and the mirror consequently returns automatically into its position for use (FIG. 24). This embodiment of the invention has the additional advantage over the embodiments previously described that the mirror housing 20.9 returns more slowly from the freed rear end position into its position for use than would be possible without the reciprocal engagement between the friction plate 42.9, on the one hand, and the catch member 30.9 and the catch element 10.9, respectively, on the other hand. Due to the further fact that the tensile force of the tension spring 100 is only slightly greater than the sliding friction between the disks 14.9 and 41.9, on the one hand, and the friction plate 42.9, on the other hand, fingers can no longer become trapped between the bent-off forward edge 21.9 of the mirror housing 20.9 and the opposite edge portion, because fingers which may be endangered can be withdrawn in time before the position for use is assumed and, furthermore, the clamping force which is exerted, if appropriate, by the front edge 21.9 is substantially less than previously expected.

Figure 29:
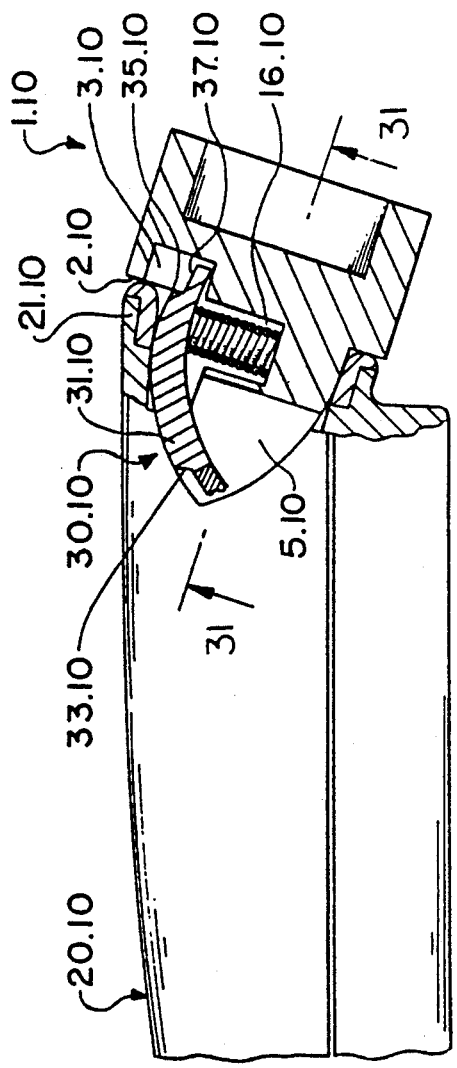
FIG. 29 shows a representation similar to FIG. 1 of a tenth embodiment.
Figure 30:
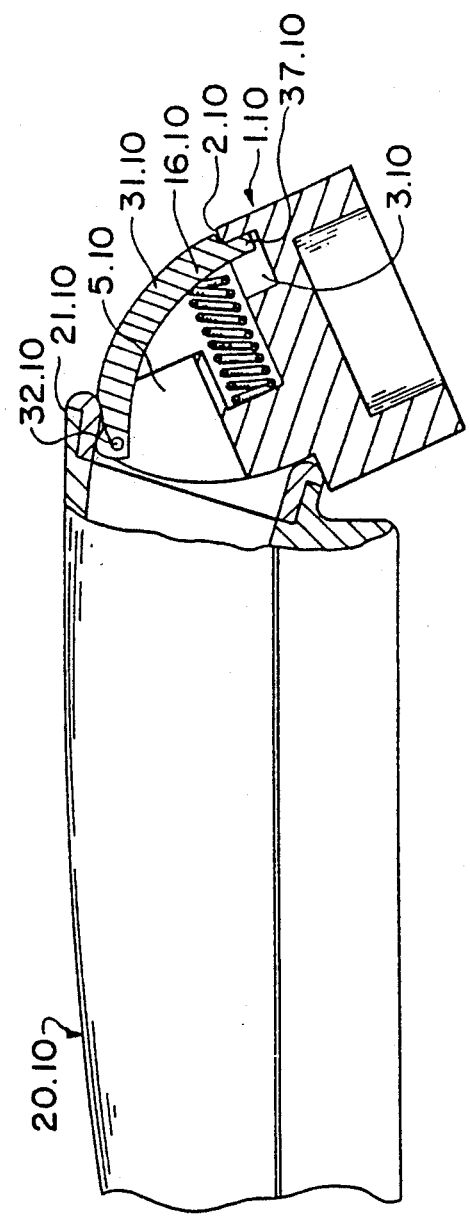
FIG. 30 shows a representation similar to FIG. 2 of the tenth embodiment.
Figure 31:
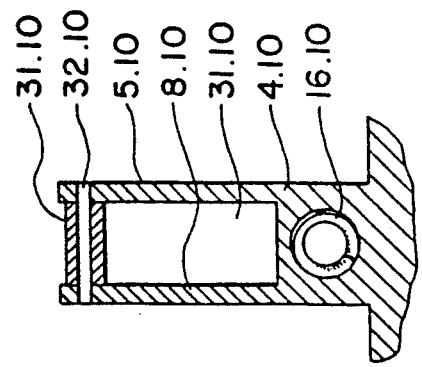
FIG. 31 shows an enlarged representation of a detail from FIG. 29 in the section D—D.

In the case of the tenth embodiment of the outside mirror, represented in FIGS. 29 to 31, a catch member 30.10 is articulated at forks 5.10, 8.10 of a holding plate 4.10 of the mirror base 1.10 about an axis parallel to the tilt axis of the mirror housing 20.10. The swivel shaft 22.10, on which the swivel arm 31.10 is mounted, is held at the ends of the forks 5.10, 8.10, reaching inside the mirror housing 20.10. The swivel arm 31.10 extends in the direction of the edge portion 2.10 of the mirror base 1.10 for the front edge section 21.10 of the mirror housing 20.10 with a curved front outer contour. The free end of the swivel arm 31.10 reaches with a lug 37.10 into a longitudinal slot 3.10 in the mirror base 1.10, which extends transversely to the tilt axis of the mirror housing from front to back and ends in the vicinity of the edge portion 2.10 for the front edge section 21.10.

The swivel arm 31.10 is under the load of a spiral spring 16.10, which extends in the direction of the longitudinal slot 3.10 and is accommodated in a pocket 9.10 of the mirror base 1.10. The spring 16.10 presses the swivel arm 31.10 forward so that, in the tilted end position of the mirror housing 20.10, represented in FIG. 30, the lug 37.10 of the swivel arm bears against the front inner surface of the longitudinal slot 3.10 and the one forward-facing shoulder 35.10 of the swivel arm 31.10 rests on the edge portion 2.10.

If the mirror housing 20.10 is tilted backward, the swivel arm 31.10 remains pressed under the compression of the spring 16.10 in the direction of the front inside surface of the slot 3.10 so that the inside of the front edge section 21.10 rides on the bent outside contour until the front edge section 21.10 drops with its crowned contour into a trap 33.10 formed on the swivel arm 31.10 in the vicinity of the swivel shaft 32.10. The swivel arm 31.10 is constantly pushed forward in this case by the spring 16.10 in the tilting of the mirror housing. The tilted end position is, therefore, defined by dropping of the front edge section 21.10 into the trap 33.10.

To disengage the mirror housing 20.10 from the end position (FIG. 30), a small forward blow is exerted on the mirror housing, which blow frees the front edge section 21.10 from the trap 33.10 and allows the mirror housing to return slowly under the action of the tension spring into the position for use (FIG. 29). The slowness of the return movement of the mirror housing 20.10 is caused by the friction contact between the bent outer contour of the swivel arm 31.10 and the inside of the front edge section 21.10. When the front edge section 21.10 comes free from the trap, the swivel arm 31.10 at the same time pivots backward against the action of the spring 16.10 to such an extent that the shoulder 35.10 comes free from the contact with the mirror base 1.10.

We claim:

1. An outside mirror for a vehicle, said outside mirror comprising;

a mirror base, a mirror housing tiltably mounted on said mirror base for forward and backward movement relative to said mirror base and out of a position of normal use, holding means for holding said mirror housing in the position of normal use at the mirror base, an edge of said mirror housing bearing against an edge of said mirror base during forward and backward movement of said mirror housing relative to said mirror base, a catch member for holding said mirror housing in a defined tilted end position, said catch member having two ends with one end pivotably mounted on said mirror base and the other end extending into said mirror housing, a catch element gripping said catch member at least in said tilted end position, said catch member being articulated about two mutually perpendicular axes, said catch element being articulated around an axis extending perpendicular to an articulated axis of said mirror housing and said catch element being completely covered by said mirror housing, a disk mounted on said other end of said catch member, a locking disk of said catch element being a same radial dimension as said disk mounted on said catch member, a friction plate enclosed between said disk of said catch member and said locking disk of said catch element, and a rivet for holding together said disk of said catch member, said locking disk of said catch element and said friction plate so that said disk of said catch member and said locking disk of said catch element press against said friction plate with such a force that a tensile force of said holding means is insufficient to overcome static friction between said friction plate and both said disk of said catch member and said locking disk of said catch element.

* * * * *